United States Patent
Narula et al.

(10) Patent No.: US 12,422,541 B2
(45) Date of Patent: Sep. 23, 2025

(54) POSITIONING CO-LOCATED USER EQUIPMENT IN A VEHICLE TO EVERYTHING (V2X) ENVIRONMENT

(71) Applicant: QUALCOMM Incorporated, San Diego, CA (US)

(72) Inventors: Mohit Narula, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/159,199

(22) Filed: Jan. 25, 2023

(65) Prior Publication Data

US 2024/0248195 A1    Jul. 25, 2024

(51) Int. Cl.
G01S 13/76    (2006.01)

(52) U.S. Cl.
CPC ................................. *G01S 13/765* (2013.01)

(58) Field of Classification Search
CPC ....... H04W 64/00; H04W 4/40; H04W 4/023; H04W 4/027; H04W 4/46; G01S 1/026; G01S 13/765
See application file for complete search history.

(56) References Cited

U.S. PATENT DOCUMENTS

| 10,356,577 B1* | 7/2019 | Kugler | H04W 4/029 |
| 2015/0087328 A1* | 3/2015 | Chao | H04W 64/00 455/456.1 |
| 2018/0035255 A1* | 2/2018 | Kordybach | H04W 4/40 |
| 2019/0132703 A1* | 5/2019 | Ramasamy | H04W 4/029 |
| 2021/0306979 A1* | 9/2021 | Choi | H04L 5/0053 |
| 2024/0349014 A1* | 10/2024 | Scherzer | H04W 4/40 |

FOREIGN PATENT DOCUMENTS

| WO | WO-2020197556 A1 * | 10/2020 | H04W 12/64 |
| WO | 2022212974 A1 | 10/2022 | |
| WO | 2022220941 A1 | 10/2022 | |
| WO | WO-2022220935 A1 * | 10/2022 | G01S 5/0072 |

OTHER PUBLICATIONS

International Search Report and Written Opinion—PCT/US2023/080580—ISA/EPO—Mar. 26, 2024.

* cited by examiner

*Primary Examiner* — Dung Hong
(74) *Attorney, Agent, or Firm* — Thien T. Nguyen

(57) ABSTRACT

Techniques are provided for determining the position of co-located wireless nodes. An example method for positioning co-located user equipment in a vehicle-to-everything (V2X) environment includes determining a first distance to a first wireless node, sending an indication of a co-located state to a second wireless node based at least in part on the first distance to the first wireless node, receiving a first position estimate based at least in part on radio frequency signal exchanges between the first wireless node and the second wireless node, determine a second distance to the first wireless node, sending an indication of a non-co-located state to the second wireless node based at least in part on the second distance to the first wireless node, and determining a second position estimate based at least in part on radio frequency signal exchanges with the second wireless node.

30 Claims, 14 Drawing Sheets

POSITIONING CO-LOCATED USER EQUIPMENT IN A VEHICLE TO EVERYTHING (V2X) ENVIRONMENT

BACKGROUND

The following relates generally to wireless communications, and more specifically to determining the locations of user equipment in a V2X environment.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as distributed wireless networks, wireless devices (e.g., UEs) may directly communicate with each other (e.g., via sidelink communications) and may support various radio frequency and/or baseband capabilities. In some cases, direct communications between wireless devices may include direct communications between vehicles and systems that use such communications may sometimes be referred to as vehicle-to-everything (V2X) communication systems. V2X communication links may be configured to convey important information between vehicles regarding inclement weather, nearby accidents, road conditions, and/or the activities of nearby vehicles, for example. V2X communication systems may also be used by autonomous or semi-autonomous vehicles (e.g., self-driving vehicles or vehicles that provide driver assistance) and may provide extra information beyond the reach of the vehicle's existing system. Such V2X communications links may be used for determining the locations of wireless devices in the V2X environment.

SUMMARY

An example method for positioning co-located user equipment in a vehicle-to-everything (V2X) environment according to the disclosure includes determining a first distance to a first wireless node, sending an indication of a co-located state to a second wireless node based at least in part on the first distance to the first wireless node, receiving a first position estimate based at least in part on radio frequency signal exchanges between the first wireless node and the second wireless node, determine a second distance to the first wireless node, sending an indication of a non-co-located state to the second wireless node based at least in part on the second distance to the first wireless node, and determining a second position estimate based at least in part on radio frequency signal exchanges with the second wireless node.

An example method for determining a position estimate for a co-located wireless node according to the disclosure includes receiving an indication of a co-located state from a first wireless node, transmitting one or more positioning signals to a second wireless node in response to the indication of the co-located state, determining the position estimate based at least in part on the one or more positioning signals transmitted to the second wireless node, and transmitting the position estimate to the first wireless node.

An example method of providing positioning signals with sidelink transmissions according to the disclosure includes receiving sidelink positioning switch information from a first wireless node, ceasing transmitting the positioning signals to the first wireless node in response to the sidelink positioning switch information including a first value, and transmitting the positioning signals to the first wireless node in response to the sidelink positioning switch information including a second value.

Items and/or techniques described herein may provide one or more of the following capabilities, as well as other capabilities not mentioned. Wireless nodes such as user equipment may be utilized by pedestrians and vehicles in a V2X environment. Pedestrian user equipment, such as a smartphone, may be carried by a user, and vehicle user equipment, such as an on-board unit, may be installed in a vehicle. When a user brings their pedestrian user equipment into a vehicle, the respective user equipment may be configured to determine they are co-located with the other user equipment. The pedestrian user equipment may be configured to provide an indication of a co-located status to a network wireless node such as a base station or an access point. The network may be configured to cease transmitting and/or receiving radio frequency positioning messages with the pedestrian user equipment when it is co-located with the vehicle user equipment. The network may perform positioning signal exchanges with the vehicle user equipment and utilize the resulting position estimates as the location of both the vehicle user equipment and the co-located pedestrian user equipment. The pedestrian user equipment may send an indication of a non-co-located status when the user exits the vehicle and is no longer co-located with the vehicle user equipment, and then resume normal positioning exchanges with the network. The signaling overhead required for positioning the pedestrian user equipment is reduced when in a co-located status. The battery life of the pedestrian user equipment may be extended. Radio frequency bandwidth may be preserved without reducing the accuracy of position estimates. Other capabilities may be provided and not every implementation according to the disclosure must provide any, let alone all, of the capabilities discussed.

DETAILED DESCRIPTION

Figure 1:
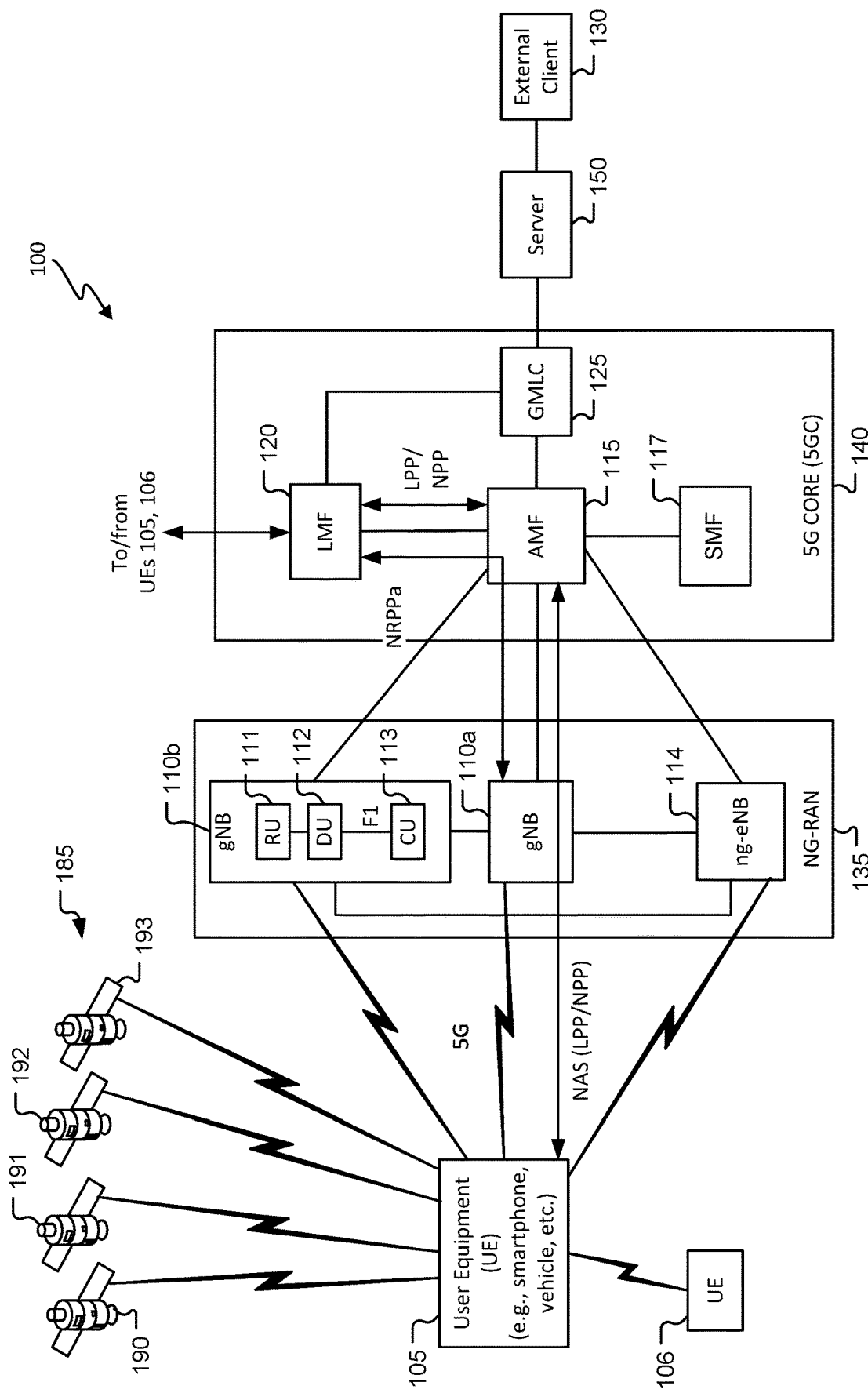
FIG. 1 is a simplified diagram of an example wireless communications system.

Techniques are discussed herein for positioning co-located user equipment, such as a handheld mobile device (e.g., a pedestrian UE) when travelling in a vehicle configured with an on-board unit (e.g., a vehicle UE). In an urban environment, there may be many pedestrians carrying UEs (P-UEs) and V2X enabled devices performing position estimates with base stations such as cellular stations (e.g., gNB) or roadside units (RSUs). There may be many V2X enabled vehicles which may be performing a similar operation. In general, position estimates may be performed periodically and may have an occurrence as frequent as every slot. The position estimates may be based on positioning signals received and/or transmitted via different V2X interfaces such as the Uu interface and PC5 (or other sidelink protocols). The resulting position estimate may be computed on a vehicle UE, a pedestrian's UE, a base-station (e.g., gNB, RSU) or on combinations thereof. For example, Uu positioning may be utilized if a vehicle does not support V2X capabilities (e.g., 3GPP TS 23.273 Section 6 provides an overview of determining a position of a target UE).

In an example use case, a pedestrian UE may be participating in positioning measurements and may be co-located with a vehicle configured to perform similar procedures, the computed position estimates and the over-the-air (OTA) signaling associated with the respective position estimates may be redundant and may not provide any unique information. The techniques discussed herein enable power conservation on a pedestrian UE, reduce overhead signaling, and may improve bandwidth efficiency without compromising the accuracy of position estimates.

In operation, in an example, when both a pedestrian UE (P-UE) and a vehicle UE (e.g., OBU, V-UE, vehicle-UE) are connected to the same base station (e.g., gNB) via Uu connections or, when both the P-UE and vehicle-UE are connected to the same RSU via PC5 or other sidelink connections, the P-UE may be configured to provide an indication in an OTA message to inform the network to switch all future positioning signaling and estimates to the vehicle-UE. For example, a P-UE may trigger the indication to switch based on the proximity to the vehicle-UE based on a distance/proximity to a vehicle and/or upon discovery of a vehicle-UE (or discovery of P-UE by the vehicle-UE). The base station may be configured to utilize the position estimate determined for the vehicle-UE as the position estimate for the co-located P-UE. The signaling required to perform the switch may be performed in a lower layer, an upper layer, or application layer signaling. In an example, additional signaling may be utilized to perform a switch back to non-co-located operations. For example, when the P-UE exits from the vehicle. Other signaling techniques may also be used.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, on-board unit (OBU), etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," "a wireless node," a "subscriber device," a "subscriber terminal," a "subscriber station," a "user terminal" or UT, a "mobile terminal," a "mobile station," a "mobile device," or variations thereof. A UE disposed in a vehicle may be called an on-board unit (OBU). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beam-forming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110a, 110b, the ng-eNB 114, etc.) to compute the UE's position.

Figure 2:
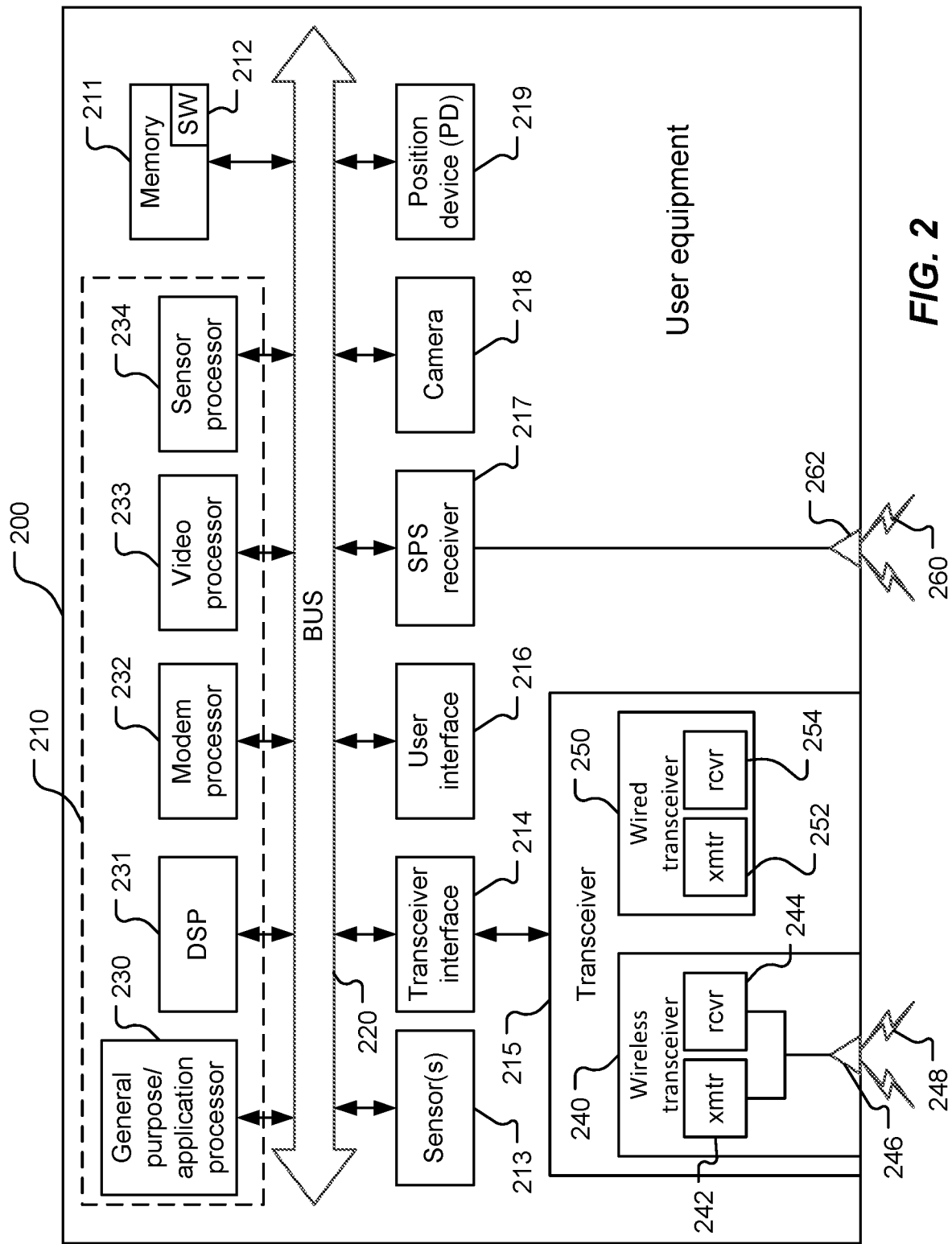
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/ report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
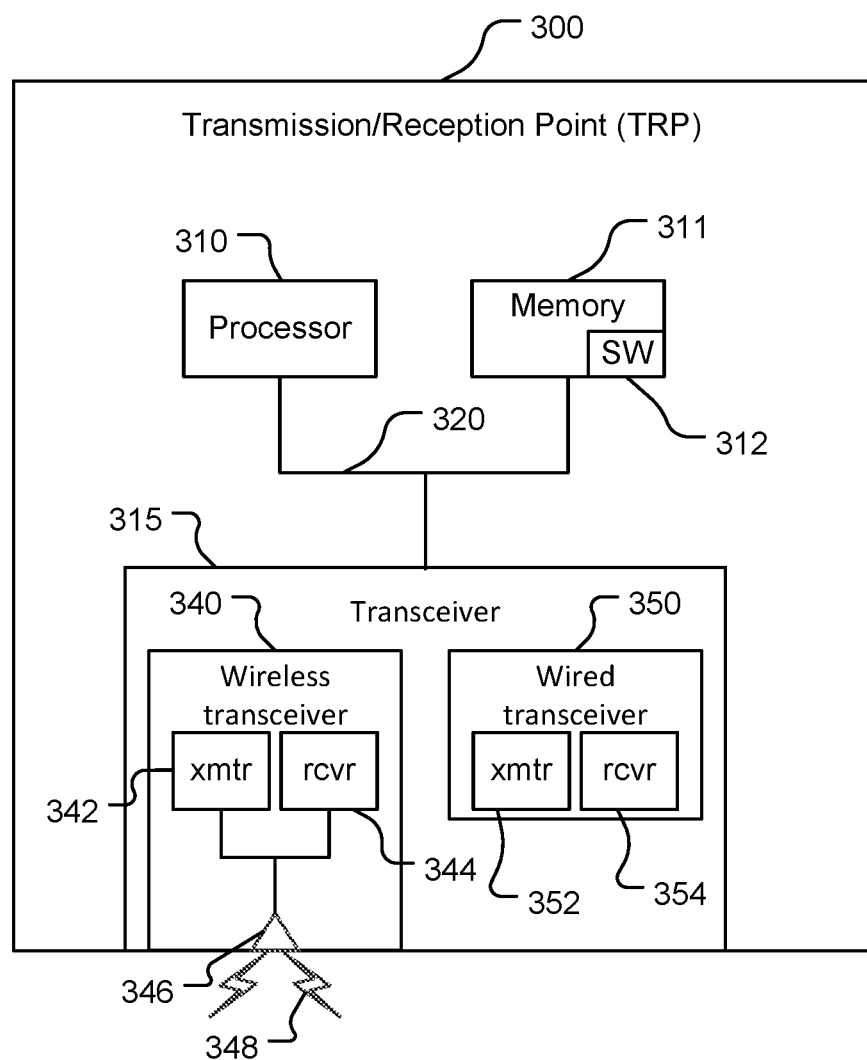
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions). In an example, a RSU may include some or all of the components of a TRP 300. The TRP 300 may be an example of a wireless node in a communications network.

Figure 4:
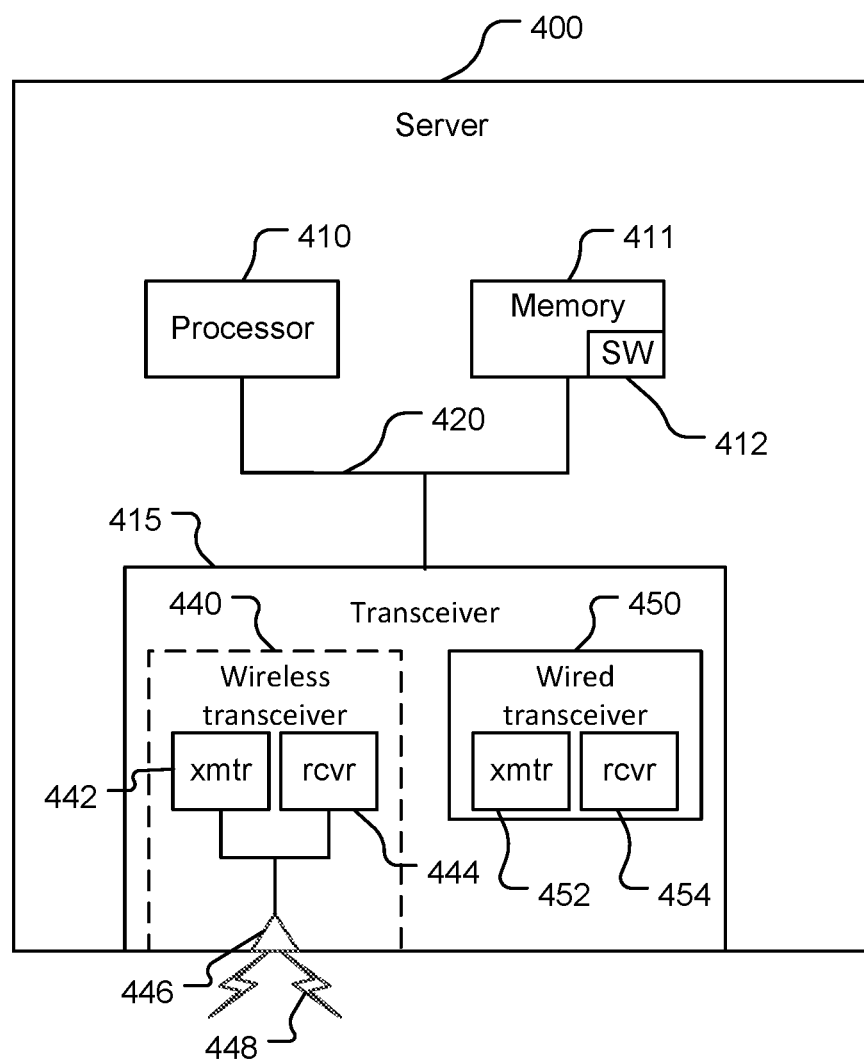
FIG. 4 is a block diagram of components of a server.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
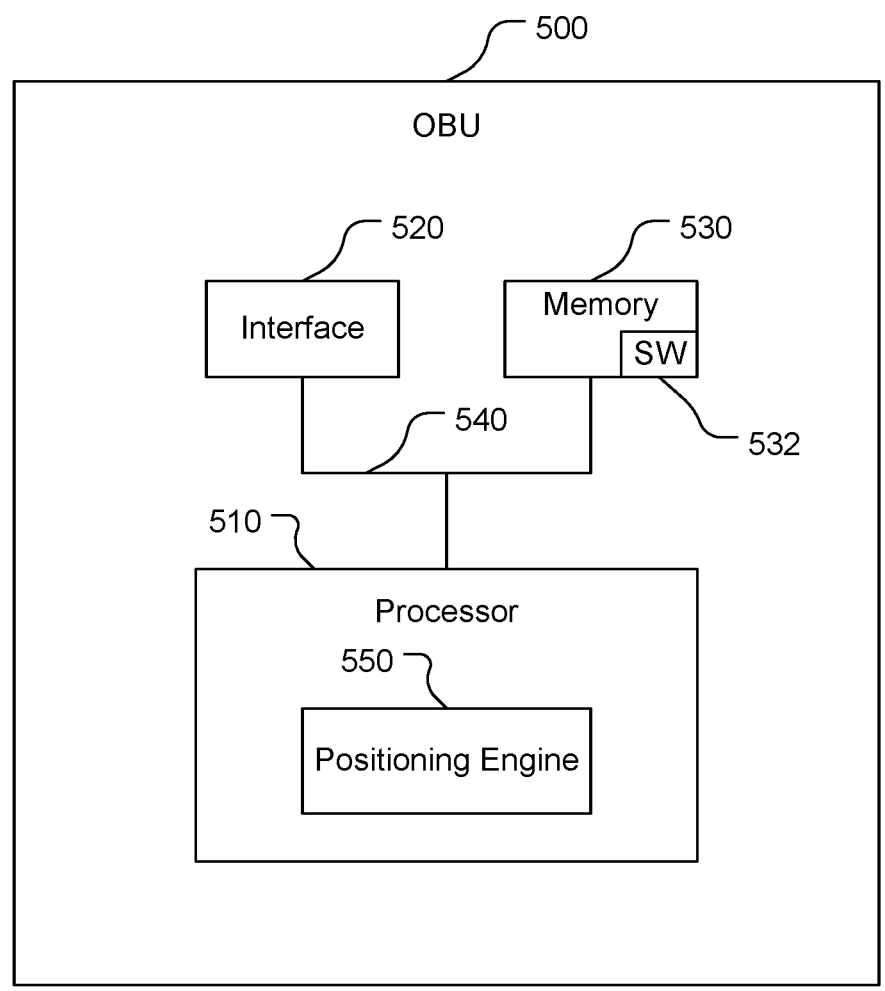
FIG. 5 is a block diagram of an example on-board unit.

Referring to FIG. 5, with further reference to FIGS. 1-4, an OBU 500 (on-board unit) includes a processor 510, an interface 520, and a memory 530 communicatively coupled to each other by a bus 540. The OBU 500 may include some or all of the components shown in FIG. 5, and may include one or more other components such as any of those shown in FIG. 2, and/or may communicate with one or more other devices (via the interface 520) with one or more features of the UE 200 (e.g., an IMU, a camera, sensors, etc.). The OBU 500 is an example of a wireless node. The processor 510 may include one or more components of the processor 210. The interface 520 is configured to transmit and receive V2X signals, e.g., C-V2X signals (i.e., signals of a C-V2X format, e.g., for communication). The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The interface 520 may include the SPS receiver 217 and the SPS antenna 262. The memory 530 may be configured similarly to the memory 211, e.g., including software 532 with processor-readable instructions configured to cause the processor 510 to perform functions. The OBU 500 may be a UE, such as the UE 200, that is also configured to communicate using C-V2X technology.

The description herein may refer to the processor 510 performing a function, but this includes other implementations such as where the processor 510 executes software (stored in the memory 530) and/or firmware. The description herein may refer to the OBU 500 performing a function as shorthand for one or more appropriate components (e.g., the processor 510 and the memory 530) of the OBU 500 performing the function. The processor 510 (possibly in conjunction with the memory 530 and, as appropriate, the interface 520) includes an positioning engine 550. The positioning engine 550 may include the processing capabilities and instructions to perform the satellite and terrestrial computations for the techniques described herein.

Figure 6:
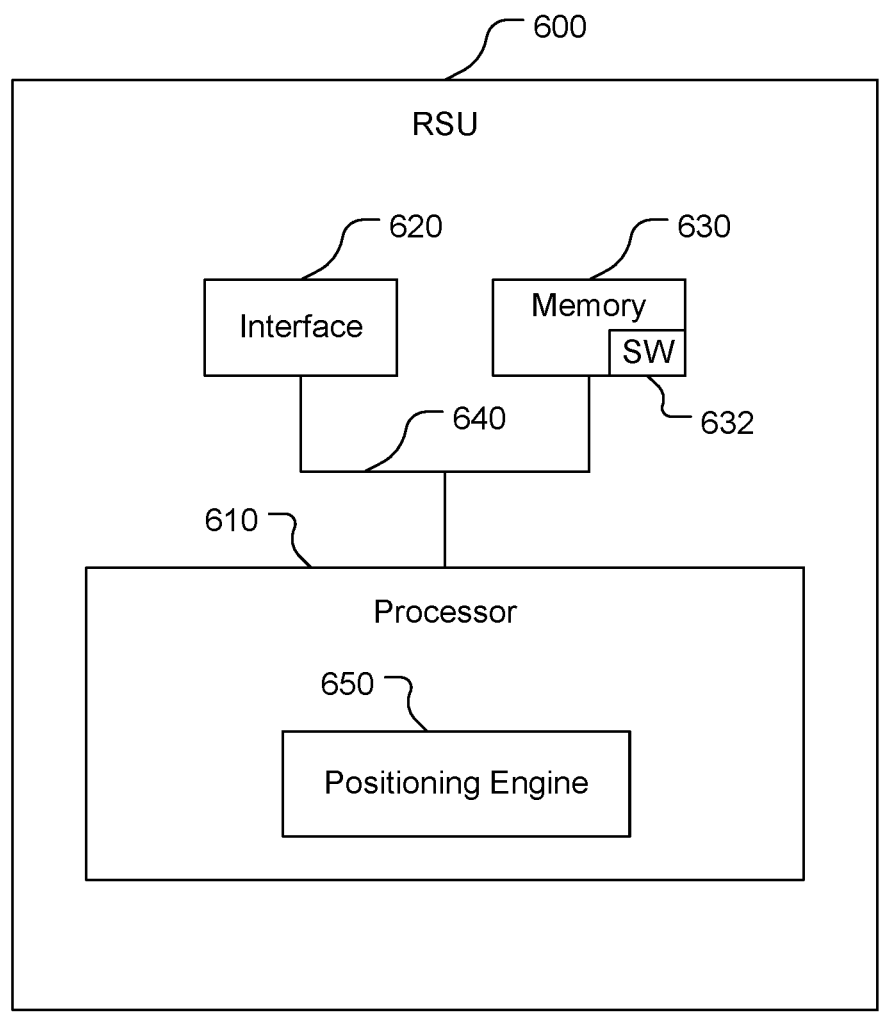
FIG. 6 is a block diagram of an example roadside unit.

Referring to FIG. 6, with further reference to FIGS. 1-2, an RSU 600 includes a processor 610, an interface 620, and a memory 630 (including software 632) communicatively coupled to each other by a bus 640. The RSU 600 may include some or all of the components shown in FIG. 6, and may include one or more other components such as any of those shown in FIG. 3. The RSU 600 is an example of a wireless node. The interface 620 may include one or more of the components of the transceiver 315, e.g., the wireless transmitter 342 and the antenna 346, or the wireless receiver 344 and the antenna 346, or the wireless transmitter 342, the wireless receiver 344, and the antenna 346. The interface 620 may include the wired transmitter 352 and/or the wired receiver 354. The interface 620 may include an SPS receiver and a SPS antenna. The description herein may refer only to the processor 610 performing a function, but this includes other implementations such as where the processor 610 executes software (stored in the memory 630) and/or firmware. The description herein may refer to the RSU 600 performing a function as shorthand for one or more appropriate components (e.g., the processor 610 and the memory 630) of the RSU 600 performing the function. The processor 610 (possibly in conjunction with the memory 630 and, as appropriate, the interface 620) may include an positioning unit 650. The positioning unit 650 may include the processing capabilities and instructions to perform the satellite and terrestrial computations for the techniques described herein.

Figure 7:
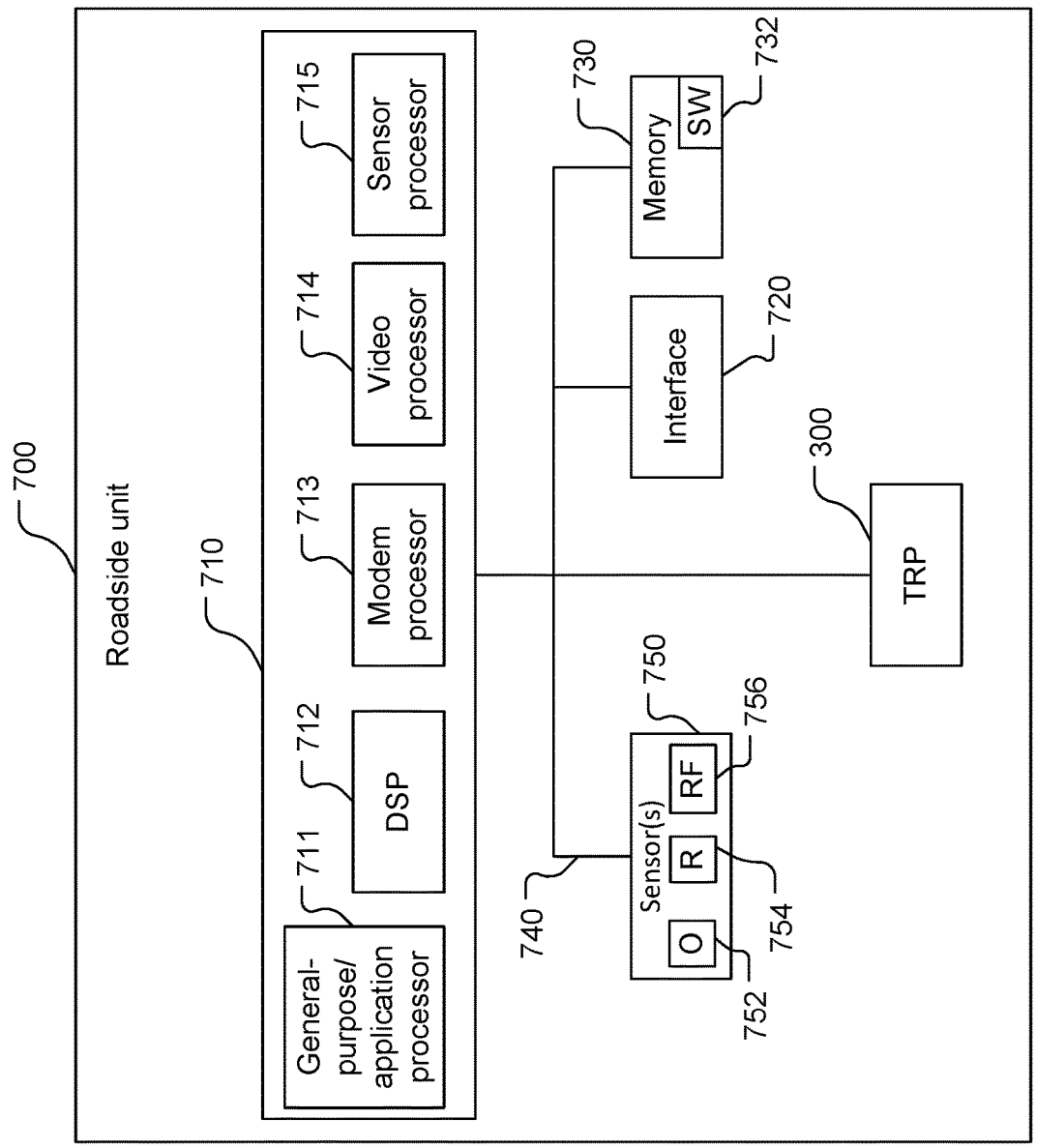
FIG. 7 is a block diagram of an example of the roadside unit shown in FIG. 6.

Referring also to FIG. 7, an RSU 700, which is an example of the RSU 600 shown in FIG. 6, includes a TRP 300, processor 710, one or more sensors 750, an interface 720, and a memory 730 communicatively coupled to each other by a bus 740. The RSU 700 may include some or all of the components shown in FIG. 7, and may include one or more other components. The processor 710 may serve as the processor 310 of the TRP 300 in the RSU 700.

The processor 710 may include one or more intelligent hardware devices, e.g., a central processing unit (CPU), a microcontroller, an application specific integrated circuit (ASIC), etc. The processor 710 may comprise multiple processors including a general-purpose/application processor 711, a Digital Signal Processor (DSP) 712, a modem processor 713, a video processor 714, and/or a sensor processor 715. One or more of the processors 711-715 may comprise multiple devices (e.g., multiple processors). For example, the sensor processor 715 may comprise, e.g., processors for radar, ultrasound, and/or lidar, etc. The memory 730 is a non-transitory storage medium that may include random access memory (RAM)), flash memory, disc memory, and/or read-only memory (ROM), etc. The memory 730 stores software 732 which may be processor-readable, processor-executable software code containing instructions that are configured to, when executed, cause the processor 710 to perform various functions described herein. Alternatively, the software 732 may not be directly executable by the processor 710 but may be configured to cause the processor 710, e.g., when compiled and executed, to perform the functions. The description may refer only to the processor 710 performing a function, but this includes other implementations such as where the processor 710 executes software and/or firmware. The description may refer to the processor 710 performing a function as shorthand for one or more of the processors 711-715 performing the function. The description may refer to the RSU 700 performing a function as shorthand for one or more appropriate components of the RSU 700 performing the function. The processor 710 and the processor 310 may share one or more components. The processor 710 may include a memory with stored instructions in addition to and/or instead of the memory 730. Functionality of the processor 710 is discussed more fully below.

The sensor(s) 750 may include an optical sensor 752, a range sensor 754, an RF sensor 756, and optionally one or more other sensors not shown. While only one optical sensor 752, one range sensor 754, and one RF sensor 756 are shown in FIG. 3, and referred to herein in the singular, the optical sensor 752 may include more than one optical sensor, the range sensor 754 may include more than one range sensor, and/or the RF sensor 756 may include more than one RF sensor. The optical sensor 752 may be configured to capture one or more images. For example, the optical sensor 752 may include one or more cameras configured to capture still images and/or video. The range sensor 754 is configured to measure ranges from the RSU 700 to objects such as UEs, OBUs, etc. The range sensor 754 may include, for example, a radar system, a sonar system, and/or a lidar system. The sensors 752, 754 are examples and not limiting of the description as numerous other types and/or quantities of sensors may be used. The RF sensor 756 may be disposed in or near an RF transaction region and configured to sense RF traffic associated with the RF transaction region.

The optical sensor 752 may include one or more cameras for capturing still or moving imagery. The camera(s) may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 711 and/or the DSP 712. Also or alternatively, the video processor 714 may perform conditioning, encoding, compression, and/or manipulation of signals representing captured images. The video processor 714 may decode/decompress stored image data for presentation on a display device (not shown).

The sensor(s) 750 and the processor 710 may for a perception system that can determine the presence, and possibly location(s), of one or more entities, e.g., vehicles. For example, one or more images from a camera of the optical sensor 752 may be analyzed to determine presence of one or entities. Radar, sonar, and/or lidar measurements may be used to detect entity presence and location. As another example, signal measurements, e.g., RSSI, RSRP, made by the RF sensor 756 may be used to determine a distance to an object, and location to the object if the signal measurements are directive, e.g., made using a beamforming antenna, or made by an antenna with a narrow beam directed in a known direction. In any of these ways, one or more objects containing OBUs may be perceived by the RSU 700 independently of whether RF communications are received from the OBUs.

The interface 720 includes one or more interface components in addition to the transceiver 315 of the TRP 300 of the RSU 700. For example, the interface 720 may include an antenna and a wireless receiver in addition to the transceiver 315.

Figure 8:
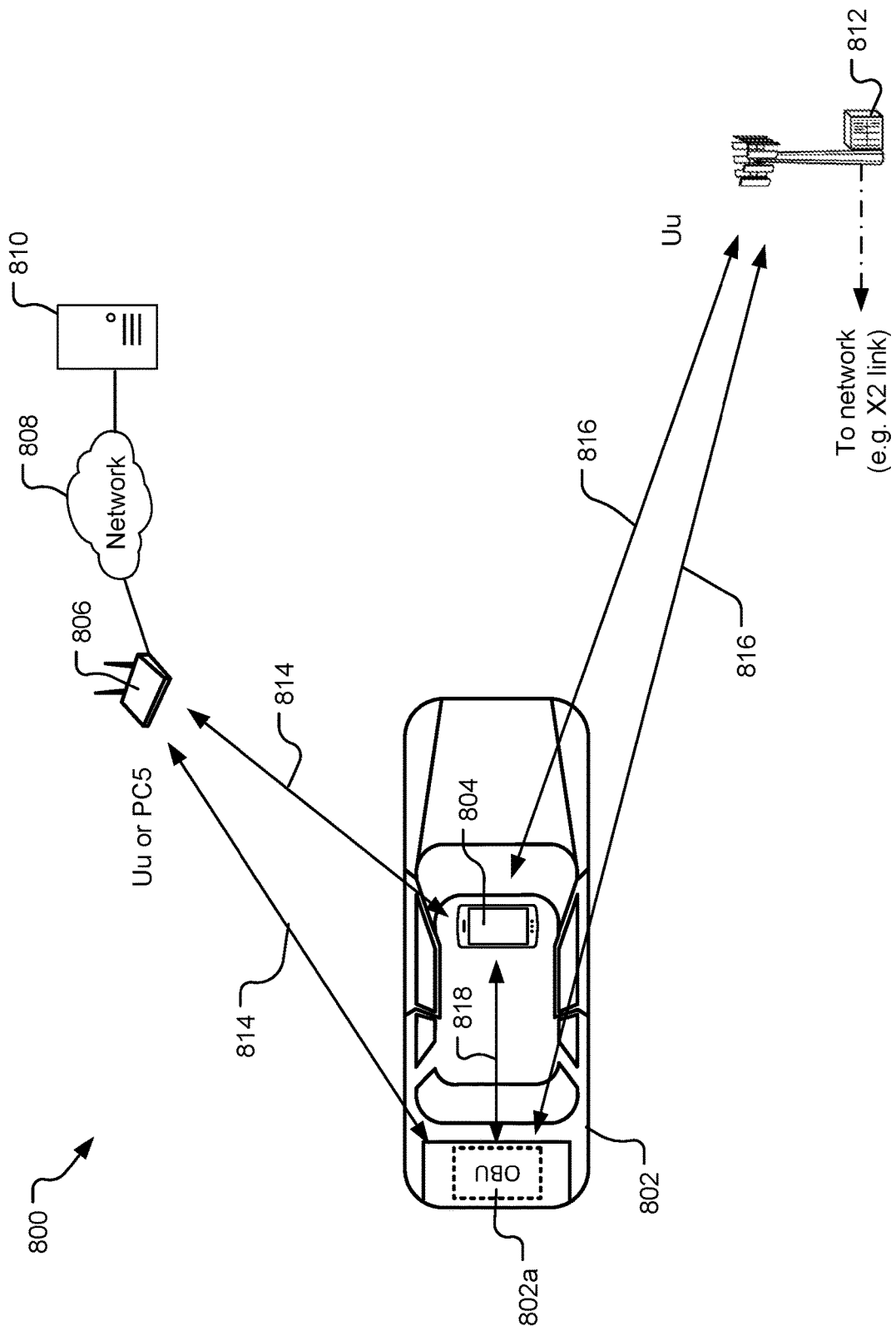
FIG. 8 is a diagram of example use cases for positioning co-located user equipment.

Referring to FIG. 8, a diagram 800 of example use cases for positioning co-located user equipment is shown. The diagram 800 includes elements of a V2X environment such as a vehicle 802 including an OBU 802a configured to communicate with other wireless nodes such as a P-UE 804, an RSU 806 and a gNB 812. The OBU 802a is a vehicle-UE and may include one or more of the components of the UE 200, and the UE 200 may be an example of the OBU 802a. The P-UE 804 may include some or all of the components of the UE 200, and the UE 200 may be an example of the P-UE 804. The RSU 600 may be an example of the RSU 806 and the TRP 300 may be an example of the gNB 812. The RSU 806 may be communicatively coupled to a server 810 via a network 808. The network 808 may include a WAN and/or the Internet. The network 808 may include some or all of the elements of the communication network 100. The gNB 812 may be communicatively coupled to the RSU 806 and/or the server 810 via the network 808. The P-UE 804 and the OBU 802a may be configured to communicate via a D2D link 818 utilizing WiFi, BTE or other commercially available wireless protocols. The entities depicted in the diagram 800 may be configured to utilize V2X communication technologies such as WiFi, sidelink, PC5 and Uu interfaces.

In general, V2X communication technologies are configured to pass information between a vehicle and any other entity that may affect or be affected by the vehicle. The OBU 802a may be configured to communicate with other entities such as infrastructure (e.g., a stop light), pedestrians (e.g., P-UE), other vehicles, and other wireless nodes. In an example, V2X may encompass other more specific types of communication such as Vehicle-to-Infrastructure (V2I), Vehicle-to Vehicle (V2V), Vehicle-to-Pedestrian (V2P), Vehicle-to-Device (V2D), and Vehicle-to-Grid (V2G).

Vehicle-to Vehicle (V2V) is a communication model designed to allow vehicles or automobiles to "talk" to each other, typically by having the automobiles form a wireless ad hoc network on the roads. Vehicle-to-Infrastructure (V2I) is a communication model that allows vehicles to share information with the components that support a road or highway system, such as overhead radio-frequency identification (RFID) readers and cameras, traffic lights, lane markers, streetlights, signage and parking meters, and so forth. Similar to V2V communication, V2I communication is typically wireless and bi-directional: data from infrastructure components can be delivered to the vehicle over an ad hoc network and vice versa. Vehicle-to-Pedestrian (V2P) communications involves a vehicle or automobile being able to communicate with, or identify a broad set of road users including people walking, children being pushed in strollers, people using wheelchairs or other mobility devices, passengers embarking and disembarking buses and trains, and people riding bicycles. Vehicle-to-Device (V2D) communications consists in the exchange of information between a vehicle and any electronic device that may be connected to the vehicle itself. Vehicle-to-Grid (V2G) communication may include a vehicle communicating with an electric power grid.

These more specific types of communication are useful for fulfilling various functions. For instance, Vehicle-to-Vehicle (V2V) is especially useful for collision avoidance safety systems, while Vehicle-to-Pedestrian (V2P) is useful for safety alerts to pedestrians and bicyclists. Vehicle-to-Infrastructure (V2I) is useful for optimizing traffic light control and issuing speed advisories, while Vehicle-to-Network (V2N) is useful for providing real-time traffic updates/routing and cloud services.

As referred to herein, V2X communications may include any of these more specific types of communication, as well as any communications between a vehicle and another entity that do not fall under one of these existing communications standards. Thus, V2X is a rather broad vehicular communication system.

V2X communication may be based on Institute of Electrical and Electronics Engineers (IEEE) 802.11 wireless local area network (WLAN) technology, LTE/5G NR PC5 and/or Uu interfaces, with vehicles and entities (e.g., V2X senders) communicating through an ad-hoc network that is formed as two V2X senders come into range with each other. In Cellular-based solutions also exist, such as 5G NR-based V2X, which are capable of leveraging that technology to provide secure communication, precise positioning, and efficient processing. For example, C-V2X may utilize the communications system 100 described in FIG. 1 for V2X communication links.

One benefit of V2X communication is safety. For instance, V2X communication can enable a vehicle to communicate with its surroundings, such that the vehicle can increase driver awareness and provide driving assistance to the driver. For instance, the vehicle may be aware of other moving vehicles and pedestrians on the road. The vehicle can then communicate their locations to the driver, who may be unaware. If accidents are avoided this way, then the safety of the other vehicles and pedestrians on the road is improved. This is just one use case for V2X for improving safety. Other examples of V2X use cases directed to safety include forward collision warning, lane change warning/blind spot warning, emergency electric brake light warning, intersection movement assist, emergency vehicle approaching, road works warning, and platooning.

V2X communications may be utilized for terrestrial positioning techniques as described herein. For example, the wireless nodes (e.g., OBU 802a, P-UE 804, RSU 806, gNB 812) may be configured to transmit and receive reference signals such as positioning reference signals (PRS). The PRS may utilize sidelink channels 814 for RTT exchanges with the RSU 806 and cellular channels 816 (e.g., Uu interface) for RTT exchanges with the gNB 812. Other positioning signals may utilize the sidelink and cellular channels 814, 816.

In a vehicle use case, the P-UE 804 and/or the OBU 802a may be configured to detect one another when in proximate locations. For example, the P-UE 804 and the OBU 802a may be configured to exchange ranging signals (e.g., WiFi, UWB, BTE, etc.) to determine a distance between one another. When the P-UE 804 and the OBU 802a are within a threshold distance (e.g., 1 m, 2 m, 5 m, etc.), the P-UE 804 may be configured to send an indication of being co-located to the RSU 806 and/or gNB 812. The indication may be included as an information element (IE) in an existing messaging protocol (e.g., LPP/NRPP, RRC, DCI, etc.) and may be other upper or lower layer signals configured to inform the network of the co-location. Upon receipt of the indication of being co-located, the P-UE 804, OBU 802a, and the communication network 100 may be configured to cease transmitting and/or receiving positioning signals to/from the P-UE 804 and to utilize the position of the OBU 802a as the position of the P-UE 804. The switch in position signaling may be implemented for a fixed duration of time (e.g., 1, 2, 5, 10, 60 mins, etc.) or until a trigger condition is realized. For example, the P-UE 804 and the communication network 100 may resume normal positioning signal operations when the P-UE 804 is no longer co-located with the OBU 802a (e.g., a threshold distance away from one another). Other device status, such as network pairing techniques, may be used to determine whether two wireless nodes are within proximity of one another.

Figure 9:
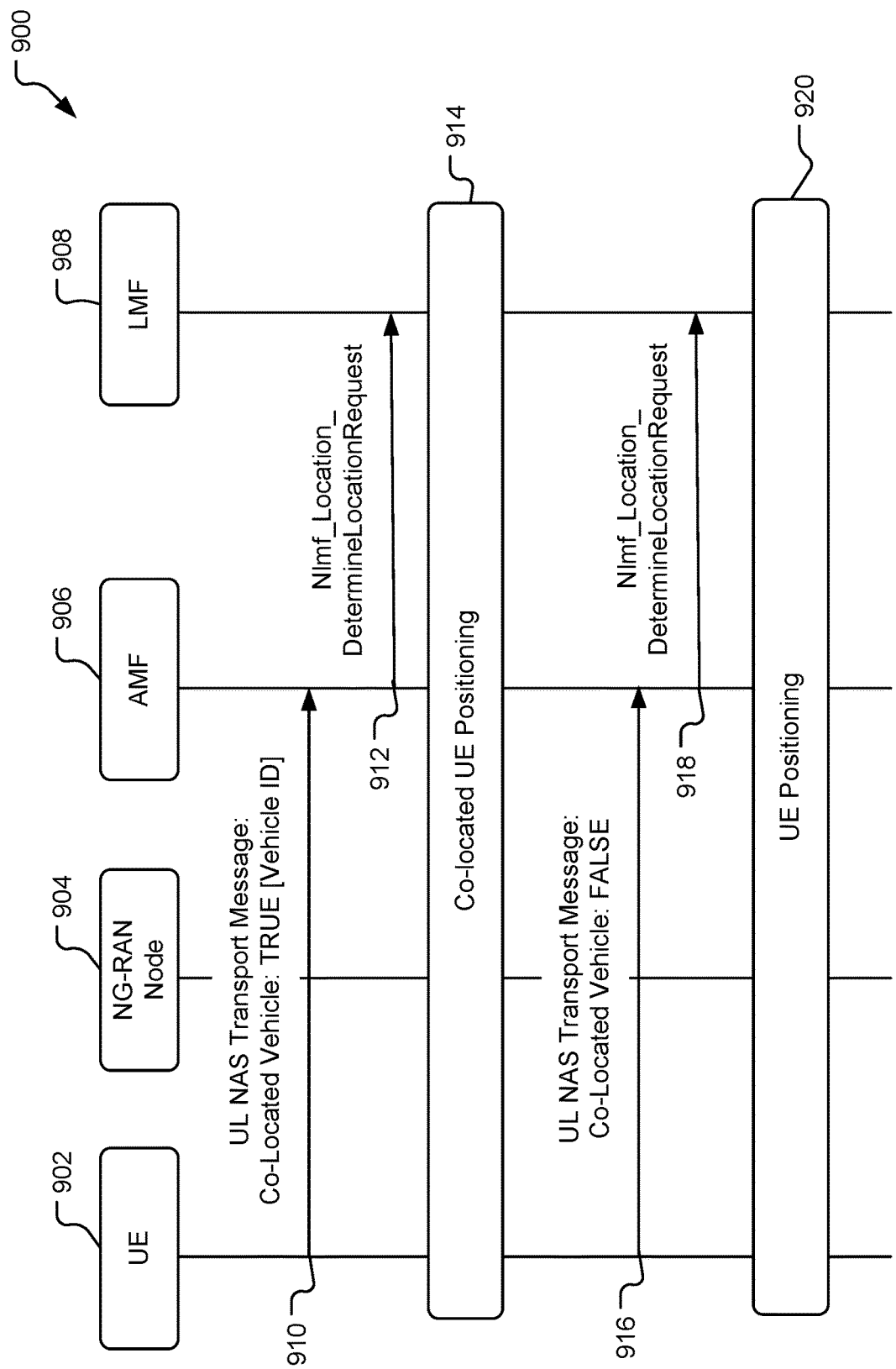
FIG. 9 is an example message flow diagram for positioning co-located user equipment in a V2X environment.

Referring to FIG. 9, an example message flow 900 for positioning co-located user equipment in a V2X environment is shown. In an example, the message flow 900 may be configured to communication between one or more of the components in the communication network 100, such as a UE 902, a NG-RAN node 904, an AMF 906, and a LMF 908. Additional or fewer components may also be used based on the architecture of a communication system. In a V2X implementation, and RSU may be configured to communicate with the LMF 908 (e.g., in place of the NG-RAN node 904). Other network topologies may also be used.

In operation, the UE 902 may determine that it is co-located with a vehicle-UE (not shown in FIG. 9) and be configured to send an indication of being co-located with another wireless node in the communication network 100. The message flow 900 is an example of signaling to provide an indication of being co-located and an indication of being non-co-located when the UE 902 is no longer co-located with a vehicle-UE. Upon being in a co-located status, the UE 902 may be configured to send a first UL NAS transport message 910 including an indication of being co-located. In an example, the indication may be an IE (e.g., field or flag) indicating a co-located status with the vehicle-UE. For example, a vehicle flag in the message 910 may be set to TRUE. The UE 902 may include an associated Destination ID or Session ID in the message 910 such that the AMF 906 may be configured to identify a unique vehicle-UE (e.g., OBU) to which the positioning estimates will be associated and switched (or switched back when in a non-co-located status). The AMF 906 may be configured to send or forward the indication of the co-located status to the LMF 908. For example, the AMF 906 may send a first Nlmf_location_DetermineLocationRequest message 912 including an indication of the co-located status of the UE 902 to the LMF 908. At stage 914, the communication network 100 (including one or more NG-RAN nodes 904) may associate the UE 902 with a co-located wireless node (e.g., vehicle-UE, OBU, etc.) as one entity (group) and provide position estimates as known in the art. After a group has been identified or as long as the UE 902 is associated with the co-located wireless node (e.g., vehicle-UE, OBU, etc.), the communication network 100 may be configured to utilize the co-located wireless node's radio resources to communicate position estimates of the UE 902. The message flow 900 is an example and not a limitation as other messaging may be used to inform the network of co-located status. For example, lower level messaging and/or signaling such as RRC, DCI and MAC-CE may be used in place of the NAS transport messages 910, 916.

Upon a detection of a non-co-located status, the UE 902 may resume standard positioning message exchanges with the communication network 100. The detection of a non-co-located status may be based on ranging signals exchanged between the UE 902 and a wireless node (e.g., vehicle-UE, OBU, etc.) or other device pairing/unpairing techniques (e.g., signal strength, error rate, etc.). The UE 902 may be configured to send a second UL NAS Transport Message 916 including an indication of a non-co-located status. For example, the non-co-located status may include modifying a co-located vehicle flag to FALSE. Other IEs may also be used to provide an indication of a non-co-located status. The AMF 906 may be configured to send a second Nlmf_location_DetermineLocationRequest message 918 to inform the LMF 908 of the non-co-located status of the UE 902. At stage 920, the communication network 100 including the UE 902 may utilize positioning messages as known in the art. For example, after receiving the message 918, the LMF 908 may configure the UE 902 to positioning independently of the formerly co-located wireless node.

Figure 10:
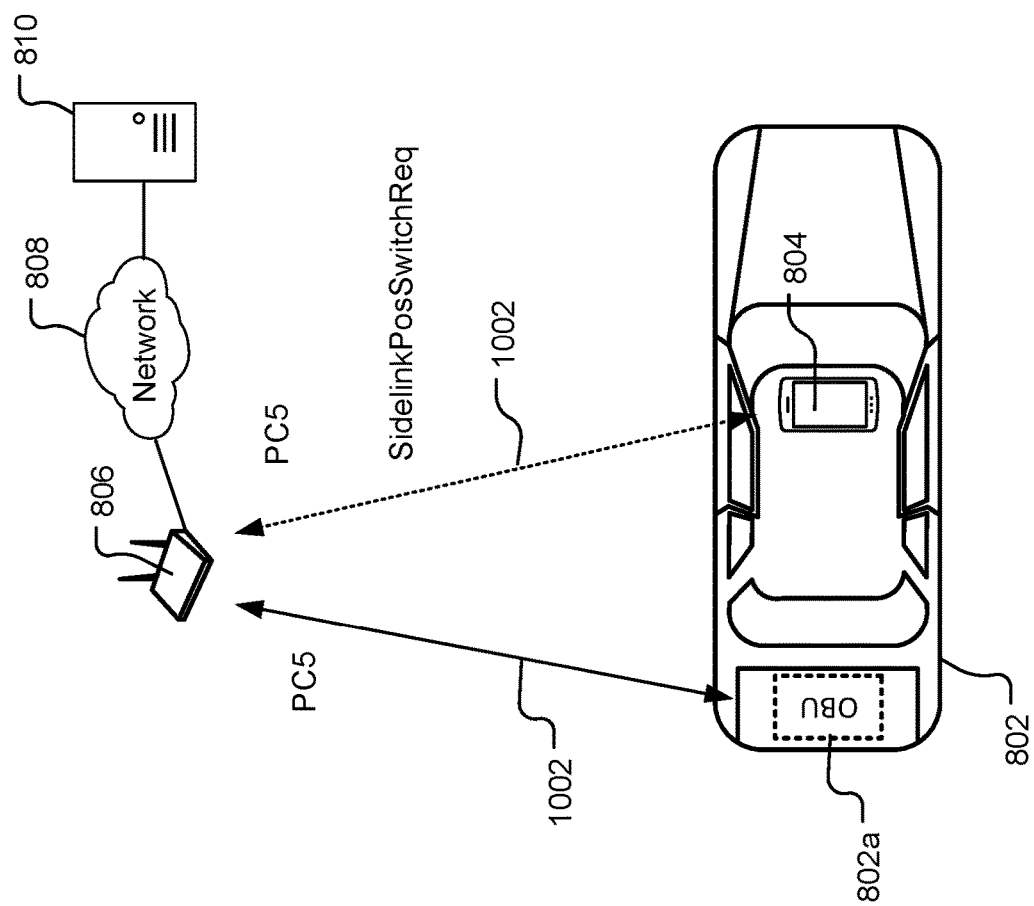
FIG. 10 is an example sidelink positioning use case for co-located user equipment.

Referring to FIG. 10, with further reference to FIG. 8, a diagram of an example sidelink positioning use case for co-located user equipment is shown. In an example, the P-UE 804 and the OBU 802a may be configured to communicate and perform positioning message exchanges with the RSU 806 via sidelink signaling 1002 or other device-to-device (D2D) technology such as the PC5 interface. In operation, when the P-UE 804 determines it is co-located with the OBU 802a, the P-UE 804 may send an indication to the RSU 806 to cease performing ranging exchanges with the P-UE 804 and to utilize the position estimates for the OBU 802a as the position of the P-UE 804. The sidelink signaling 1002 may include one or more messages, information elements, or other parameters, as the indication to switch (e.g., a SidelinkPosSwitchReq parameter). These messages, or information elements, or parameters may include the Destination ID or Session ID to which its associated. In an example, if the P-UE 804 enters and becomes co-located with the vehicle 802 (e.g., a switch event), the P-UE 804 may set the parameter SidelinkPosSwitchReq in either a pre-PRS or a post PRS messages to indicate the session or destination ID. After receiving the SidelinkPosSwitchReq parameter from the P-UE 804, the RSU 806 may be configured to stop performing RTT measurements/position estimates with the P-UE 804, and/or overwrite (e.g., re-use) the position estimates obtained from RTT exchanges with the OBU 802*a*.

Subsequently, if the P-UE 804 exits the vehicle 802 and is no longer co-located (e.g., a switch-back event), the P-UE 804 may reset or default the parameter SidelinkPosSwitchReq in a pre-PRS or a post-PRS message including the destination or session ID. After receiving the revised SidelinkPosSwitchReq parameter from the P-UE 804, the RSU 806 may be configured to initiate a fresh RTT procedure to estimate the position of the P-UE 804 independent of the OBU 802*a*. The P-UE 804 may be configured to resume normal RTT measurements until a new SideLinkPosSwitchREq message (e.g., a switch event) is received by the RSU 806. Other messaging may also be used to inform the RSU 806 of the switch and switch-back events. For example, the SidelinkPosSwitchReq parameter may be provided via RRC or other application layer signaling.

Figure 11:
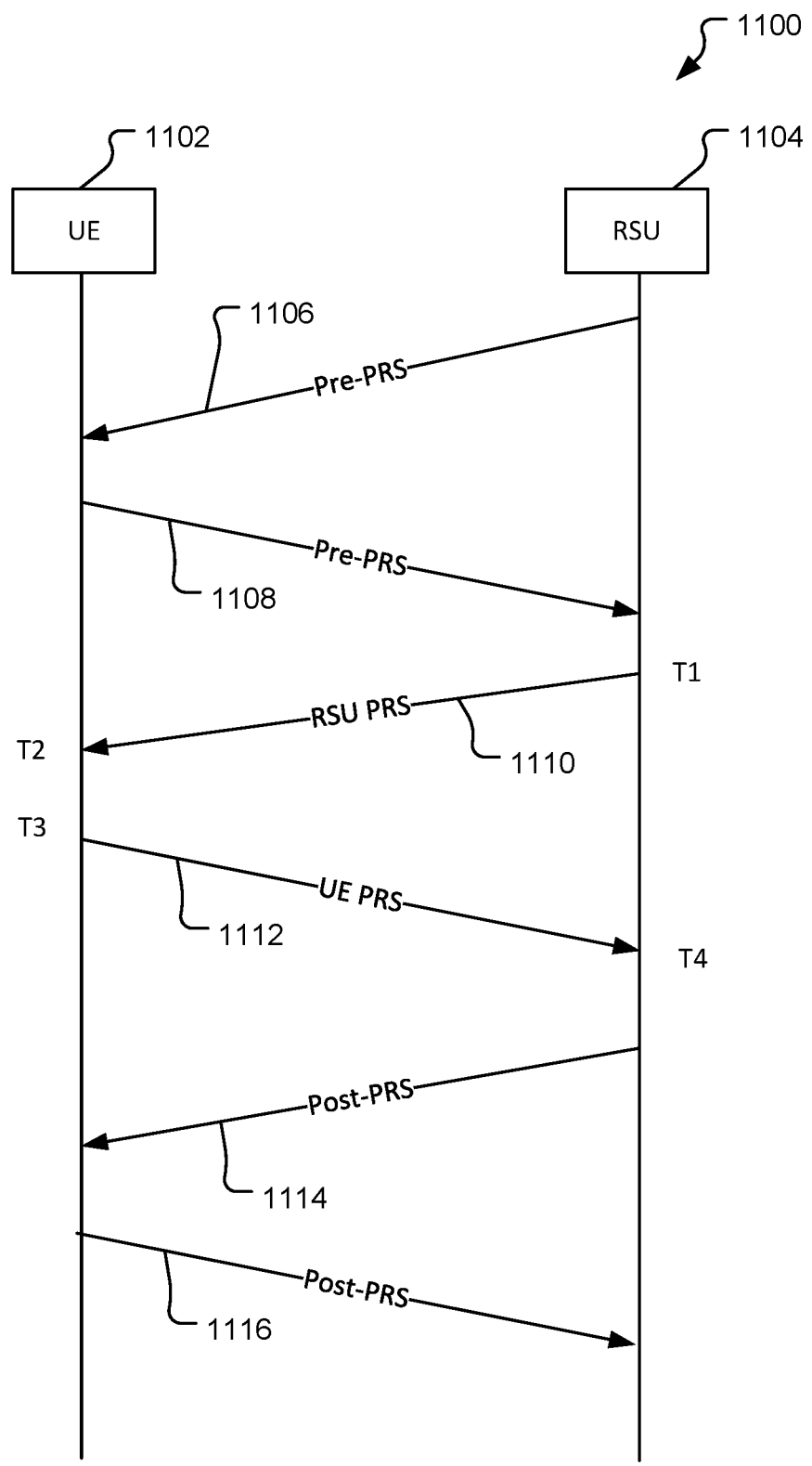
FIG. 11 is an example message flow for round trip time based positioning using sidelink transmissions.

Referring to FIG. 11, with further reference to FIG. 10, an example message flow 1100 for round trip time based positioning using the sidelink signaling 1002 is shown. The message flow 1100 includes a UE 1102 and an RSU 1104 as an example, and not a limitation as other wireless nodes may be used to perform RTT exchanges. The UE 1102 is an example of the P-UE 804 and the OBU 802*a*, and the RSU 1104 is an example of the RSU 806. In general, RTT positioning methods utilize a time for a signal to travel from one entity to another and back to determine a range between the two entities. In some examples, the range, plus a known location of a first one of the entities and an angle between the two entities (e.g., an azimuth angle) may be used to determine a location of the second of the entities. In multi-RTT (also called multi-cell RTT), multiple ranges from one entity (e.g., a UE) to other entities (e.g., RSUs, TRPs, etc.) and known locations of the other entities may be used to determine the location of the one entity. The example message flow 1100 may be initiated by either the RSU 1104 with a first pre-PRS message 1106, or by the UE 1102 with a second pre-PRS message 1108. In an example, the second pre-PRS message 1108 may include an indication of a switch event (e.g., SideLinkPosSwitchREq message) as described in FIG. 10. Other signaling may be used to configure the RTT session. At time T1, the RSU 1104 may transmit a RSU PRS 1110, which is received by the UE 1102 at time T2. In response, the UE 1102 may transmit a UE PRS 1112 at time T3 which is received by the RSU 1104 at time T4. The distance between the UE 1102 and the RSU 1104 may be computed as:

$$\text{distance} = c/2((T4 - T1) - (T3 - T2)) \qquad (1)$$

where c=speed of light.

The RSU 1104 and the UE 1102 may be configured to provide respective post-PRS messages 1114, 1116. In an example, the UE 1102 may utilize the post-PRS message 1116 to send an indication of the switching event (e.g., SideLinkPosSwitchREq message) as described in FIG. 10. Other information, such as position estimates, may be included in the post-PRS messages 1114, 1116.

While FIG. 8 depict a single P-UE in a vehicle, the disclosure is not so limited. Multiple P-UEs may be associated with a vehicle-UE such that the positioning exchanges for each of the multiple P-UEs may be halted while co-located with the vehicle-UE. The position estimates for each of the P-UEs may be computed based on the positioning signals exchanged between the vehicle-UE and the other wireless nodes in the network. Each of the multiple P-UEs may resume normal positioning message exchanges when they are no longer co-located with the vehicle-UE. Further, the relationship between co-located devices is not limited to a P-UE and a vehicle UE. Two or more P-UEs traveling as a group (e.g., walking together, traveling on a common carrier, etc.) may be determined to be co-located (e.g., based on ranging measurements or device discovery and/or pairing procedures). In this use case, one P-UE may perform the positioning exchanges and the other co-located P-UEs may utilize the position estimates computed for the first P-UE.

Figure 12:
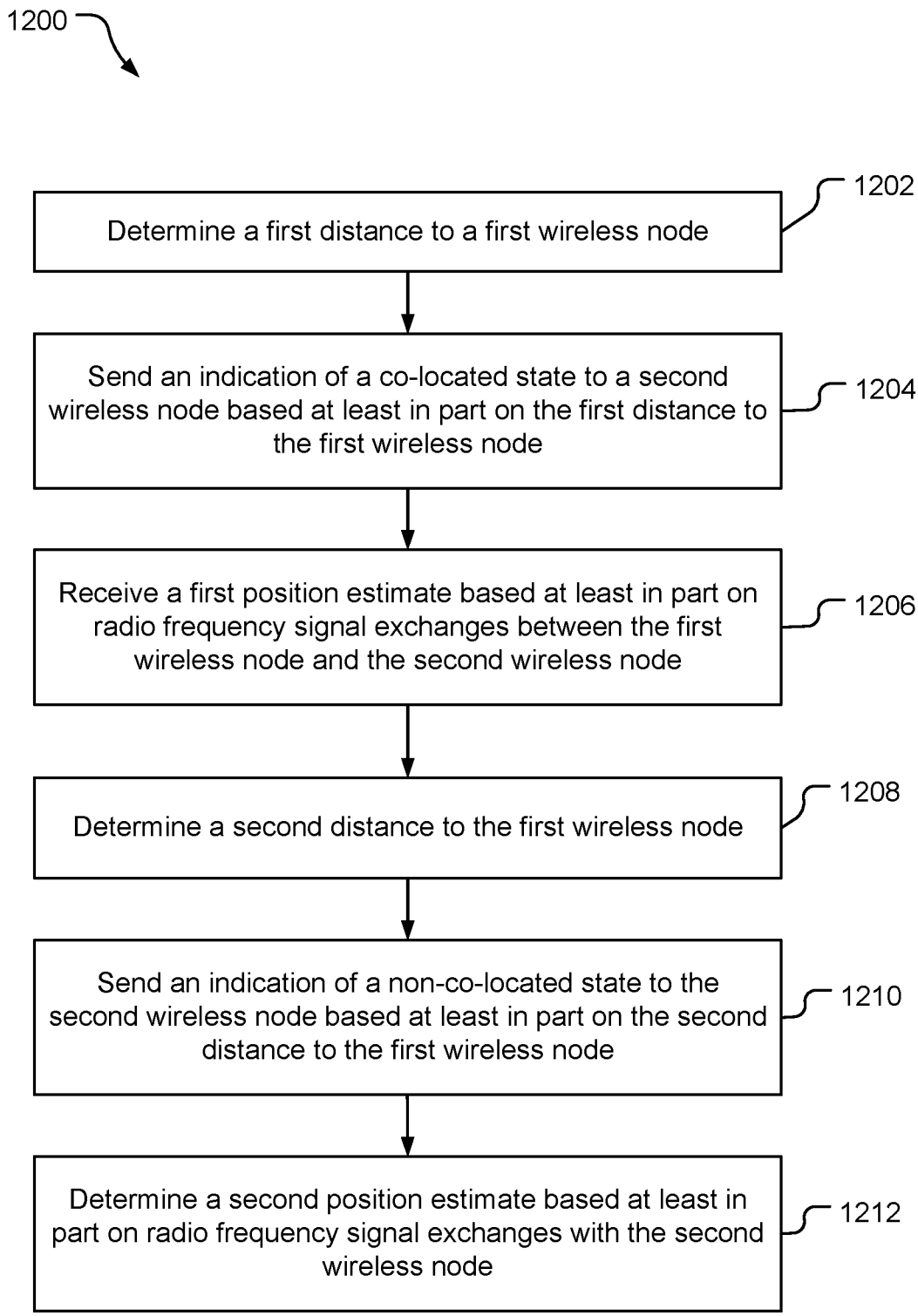
FIG. 12 is a process flow message of an example method for positioning co-located user equipment in a V2X environment.

Referring to FIG. 12, with further reference to FIGS. 1-11, a method 1200 for positioning co-located user equipment in a V2X environment includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes determining a first distance to a first wireless node. A UE 200, including processors 210 and a transceiver 215, is a means for determining the first distance. In general, determining the first distance includes procedures to detect the proximity of the wireless node and thus determine a co-located state with the wireless node. In an example, referring to FIG. 8, the P-UE 804 may be configured to perform ranging exchanges with the OBU 802*a* utilizing one or more radio technologies such as WiFi, BTE, UWB, etc. to determine the first distance. The first distance may be based on a pairing procedure between the P-UE 804 and the OBU 802*a*, or other system installed in the vehicle 802. For example, the status of device connection protocols such as BTE, WiFi, UCONNECT®, HandsFreeLink®, etc. may be used to determine the first distance (i.e., the proximity of a UE to a wireless node such as the OBU 802*a*).

At stage 1204, the method includes sending an indication of a co-located state to a second wireless node based at least in part on the first distance to the first wireless node. The UE 200, including the processors 210 and the transceiver 215, is a means for sending the indication of the co-located state. In an example, the second wireless node may be a cellular base station such as a gNB 110*a* or a ng-eNB 114. Referring to FIG. 9, upon determining a co-located status at stage 1202, a UE may be configured to send a first UL NAS transport message 910 including an indication of being co-located. In an example, the indication may be an IE (e.g., field or flag) indicating a co-located status with the vehicle-UE. For example, a vehicle flag in the message 910 may be set to TRUE. The UE may include an associated Destination ID or Session ID in the message 910 such that the AMF 906 may be configured to identify a unique vehicle-UE (e.g., OBU) to which the positioning estimates will be associated and switched. In an example, second wireless node may be and RSU 600. Referring to FIGS. 10 and 11, sidelink signaling 1002 may include one or more messages, information elements, or other parameters, as the indication of a co-located state (e.g., a SidelinkPosSwitchReq parameter). These messages, or information elements, or parameters may include the Destination ID or Session ID to which its associated. A UE may be configured to set the parameter SidelinkPosSwitchReq in either a pre-PRS message 1108 or a post PRS messages 1116 to indicate the co-located state.

At stage 1206, the method includes receiving a first position estimate based at least in part on radio frequency signal exchanges between the first wireless node and the second wireless node. The UE 200, including the processors 210 and the transceiver 215, is a means for receiving the first positioning estimate. When the P-UE 804 is co-located with the OBU 802a (e.g., the first wireless node), the P-UE 804 will cease positioning signal exchanges with the network stations such as the gNB 812 and the RSU 806 (e.g., the second wireless node). The OBU 802a will continue signal exchanges with the gNB 812 and/or the RSU 806 and the network (e.g., LMF 120) or the OBU 802a may be configured to determine the first position estimate based on the signal exchanges. In an example, the P-UE 804 may receive the first position estimate from the gNB 812 via the cellular channels 816 (e.g., Uu interface) or via other signaling protocols (e.g., RRC, LLP/NRPP, etc.). The P-UE 804 may receive the first position estimate from the RSU 806 via a sidelink channel 814. In an example, the P-UE 804 may receive the first position estimate from the OBU 802a via the D2D link 818.

At stage 1208, the method includes determining a second distance to the first wireless node. The UE 200, including processors 210 and the transceiver 215, is a means for determining the first distance. In general, determining the second distance includes procedures to detect the lack of proximity of the wireless node and thus determine a non-co-located state with the wireless node. In an example, referring to FIG. 8, the P-UE 804 may be configured to perform ranging exchanges with the OBU 802a utilizing one or more radio technologies such as WiFi, BTE, UWB, etc. to determine the second distance. The second distance may be determined based on the termination of a paired state between the P-UE 804 and the OBU 802a, or other systems installed in the vehicle 802. For example, BTE connections such as UCONNECT®, HandsFreeLink®, etc. may be used to determine the second distance (i.e., the lack of proximity of a UE to a wireless node such as the OBU 802a).

At stage 1210, the method includes sending an indication of a non-co-located state to the second wireless node based at least in part on the second distance to the first wireless node. The UE 200, including the processors 210 and the transceiver 215, is a means for sending the indication of the non-co-located state. In an example, referring to FIG. 9, upon determining a non-co-located status at stage 1208, a UE may be configured to send a second UL NAS transport message 916 including an indication of being non-co-located. In an example, the indication may be an IE (e.g., field or flag) indicating a non-co-located status with the vehicle-UE. For example, a vehicle flag in the message 916 may be set to FALSE. In an example, referring to FIGS. 10 and 11, sidelink signaling 1002 may include one or more messages, information elements, or other parameters, as the indication of a non-co-located state (e.g., a SidelinkPosSwitchReq parameter). A UE may be configured to set the parameter SidelinkPosSwitchReq in a pre-PRS message 1108 to indicate the non-co-located state and proceed with a RTT exchange with the RSU.

At stage 1212, the method includes determining a second position estimate based at least in part on radio frequency signal exchanges with the second wireless node. The UE 200, including the processors 210 and the transceiver 215, is a means determining the second positioning estimate. When the P-UE 804 is no longer co-located with the OBU 802a (e.g., the first wireless node), the P-UE 804 will resume positioning signal exchanges with the network stations such as the gNB 812 and the RSU 806 (e.g., the second wireless node). In an example, the P-UE 804 may determine the second position estimate by receiving the second position estimate from the gNB 812 via the cellular channels 816 (e.g., Uu interface) or via other signaling protocols (e.g., RRC, LLP/NRPP, etc.). The P-UE 804 may receive the second position estimate from the RSU 806 via a sidelink channel 814. In an example, the P-UE 804 may be configured to compute the position estimate based on the radio frequency signal exchanges with the second wireless node.

Figure 13:
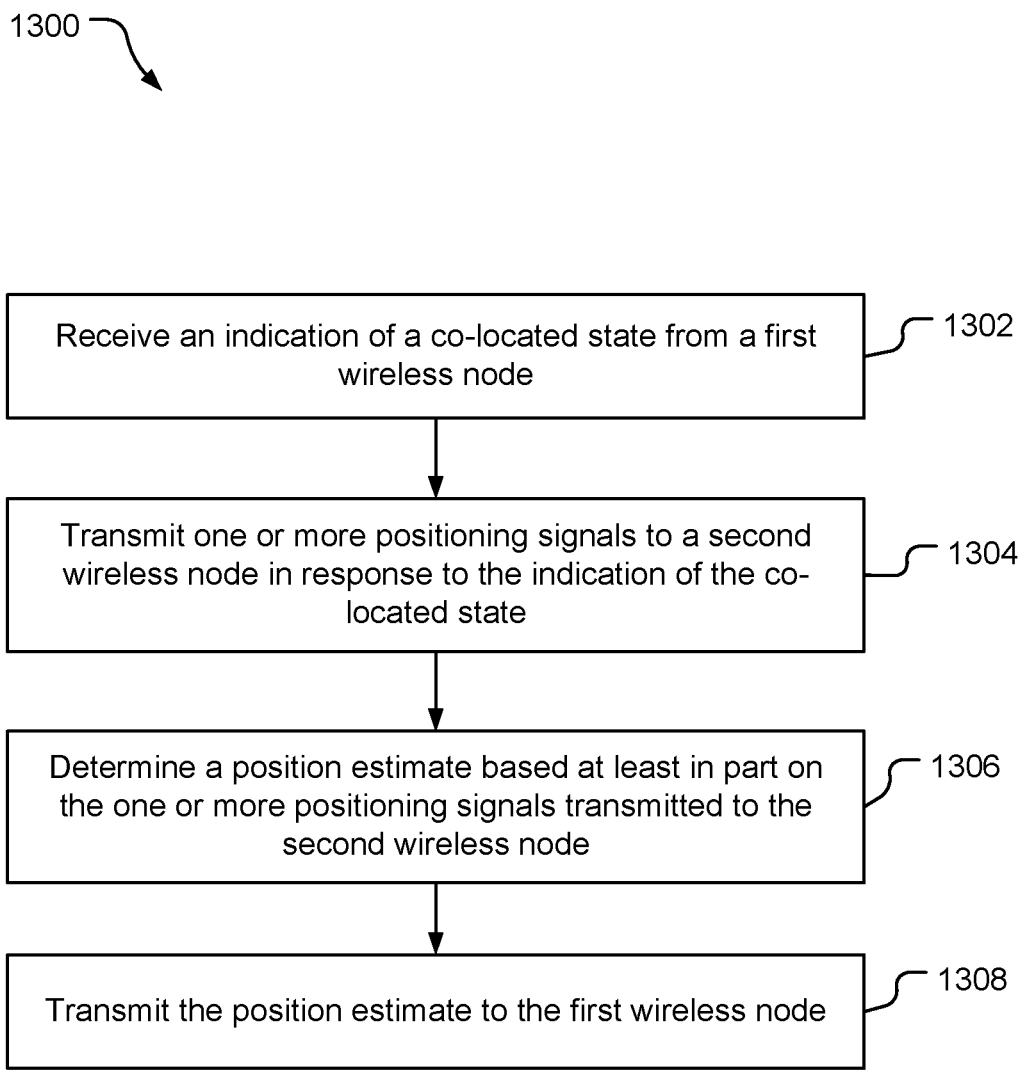
FIG. 13 is a process flow of an example method for determining a position estimate for a co-located wireless node.

Referring to FIG. 13, with further reference to FIGS. 1-11, a method 1300 for determining a position estimate for a co-located wireless node includes the stages shown. The method 1300 is, however, an example and not limiting. The method 1300 may be altered, e.g., by having stages added, removed, rearranged, combined, performed concurrently, and/or having single stages split into multiple stages. The method 1300 may be performed by wireless nodes in a network such as a TRP 300 and a RSU 600.

At stage 1302, the method includes receiving an indication of a co-located state from a first wireless node. A TRP 300 (including the processor 310 and the transceiver 315) or a RSU 600 (including the processor 610 and interface 620) are means for receiving the indication of a co-located state. Referring to FIG. 9, upon determining a co-located status, the UE 902 may be configured to send the indication of a co-located state to a network entity, such as the AMF 906 or the LMF 908. For example, the AMF 906 may receive the first UL NAS transport message 910 including an indication of being co-located via the NG-RAN node 904. The indication of the co-located state may be an IE (e.g., field or flag). For example, a vehicle flag in the message 910 may be set to TRUE. In an example, referring to FIGS. 10 and 11, the RSU 806 may receive the indication of the co-located state via sidelink signaling 1002 including one or more messages, information elements, or other parameters, with the indication of a co-located state (e.g., a SidelinkPosSwitchReq parameter). The indication of the co-located state may be included in either a pre-PRS message 1108 or a post PRS messages 1116 transmitted by the P-UE 804.

At stage 1304, the method includes transmitting one or more positioning signals to a second wireless node in response to the indication of the co-located state. The TRP 300 and the RSU 600 are means for transmitting the one or more positioning signals. In an example, referring to FIG. 8, when the P-UE 804 (i.e., the first wireless node) is co-located with the OBU 802a (e.g., the second wireless node), the P-UE 804 will cease positioning signal exchanges with the network stations such as the gNB 812 and the RSU 806. The gNB 812 and the RSU 806 will continue signal exchanges with the OBU 802a. The one or more positioning signals may be PRS and other reference signals as described herein. For example, the positioning signals may be PRS such as described in FIG. 11. Other signal exchanges may also be used.

At stage 1306, the method includes determining a position estimate based at least in part on the one or more positioning signals transmitted to the second wireless node. The TRP 300 and the RSU 600 are means for determining a position estimate. In an example, a network server 400 (e.g., LMF 120, RSU 806) may be configured to determine the position estimate based on measurements of signal exchanges including the positioning signals transmitted at stage 1304. The position estimate may be based on multiple RTT exchanges with one or more wireless nodes and the associated timing and angle measurements (e.g., AoA, AoD). In the vehicle use case, the position estimate is the location of the second wireless device (e.g., the OBU 802a) based on the exchanges with the network stations.

At stage 1308, the method includes transmitting the position estimate to the first wireless node. The TRP 300 and the RSU 600 are means for transmitting the position estimate. In the vehicle use case, the P-UE 804 may receive the position estimate from the gNB 812 via the cellular channels 816 (e.g., Uu interface) or via other signaling protocols (e.g., RRC, LLP/NRPP, etc.). The P-UE 804 may receive the first position estimate from the RSU 806 via a sidelink channel 814. Thus, the network provides the computed position of the OBU 802*a* to the co-located P-UE 804.

Figure 14:
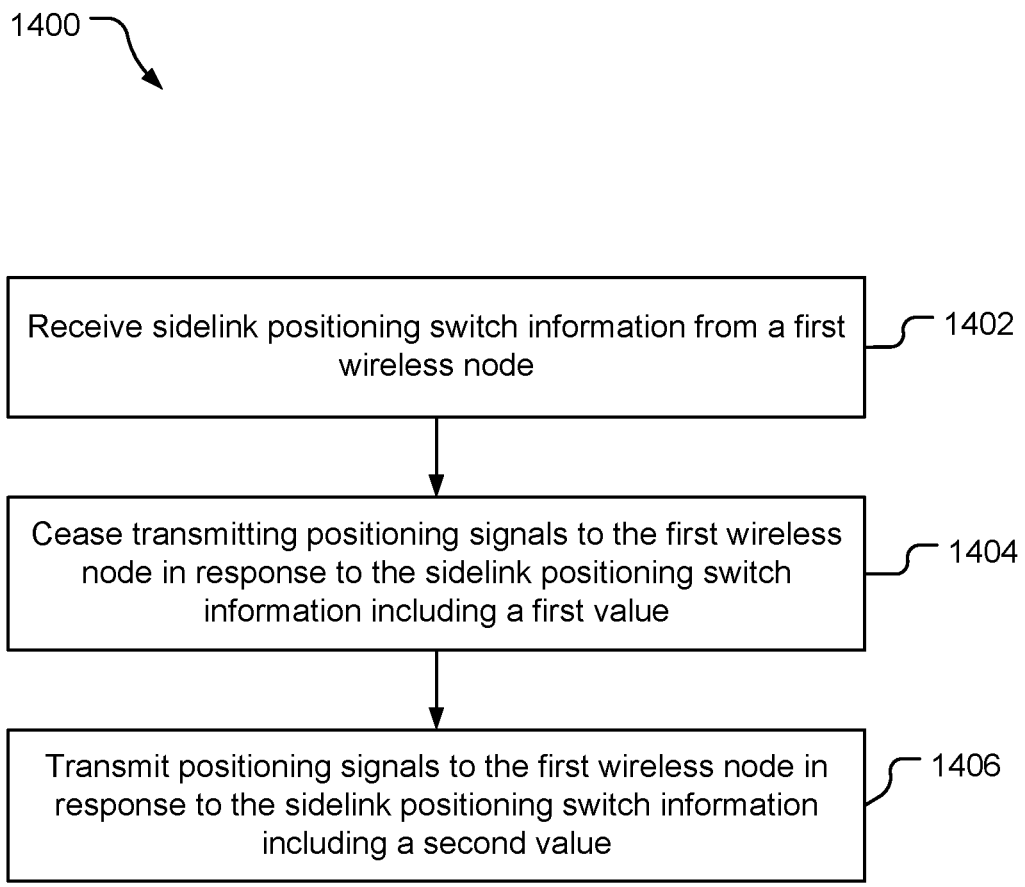
FIG. 14 is a process flow of an example method for providing positioning signals with sidelink transmissions.

Referring to FIG. 14, with further reference to FIGS. 1-11, a method 1400 for providing positioning signals with sidelink transmissions includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes receiving sidelink positioning switch information from a first wireless node. A RSU 600, including the processor 610 and the interface 620, is a means for receiving the sidelink positioning switch information. In an example, referring to FIGS. 10 and 11, the RSU 806 may receive sidelink positioning switch information when the P-UE 804 determines it is co-located with the OBU 802*a*. The RSU 806 may be configured to receive sidelink signaling 1002 including one or more messages, information elements, or other parameters, as the positioning switch information (e.g., a SidelinkPosSwitchReq parameter). In an example, the messages, or information elements, or parameters may include the Destination ID or Session ID to which sidelink signaling 1002 is associated. The sidelink positioning information may be included in either a pre-PRS message 1108 or a post-PRS message 1116.

At stage 1404, the method includes ceasing transmitting positioning signals to the first wireless node in response to the sidelink position switch information including a first value. The RSU 600, including the processor 610 and the interface 620, is a means for ceasing the transmission of positioning signals. In operation, the RSU 806 may be configured to cease performing ranging exchanges with the P-UE 804 and to utilize the position estimates for the OBU 802*a* as the position of the P-UE 804. The first value may be a parameter or flag, and the RSU 806 may cease performing RTT exchanges with the P-UE 804 based on the parameter or flag value.

At stage 1406, the method includes transmitting positioning signals to the first wireless node in response to the sidelink position switch information including a second value. The RSU 600, including the processor 610 and the interface 620, is a means for transmitting positioning signals. The second value may be configured as an indication of a non-co-located state between the first wireless node (e.g., the P-UE 804) and the OBU 802*a*. A UE may be configured to include the sidelink positioning switch information at the second value in a pre-PRS message 1108 to indicate the non-co-located state and proceed with RTT exchanges with the RSU.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for positioning co-located user equipment in a vehicle-to-everything (V2X) environment, comprising: determining a first distance to a first wireless node; sending an indication of a co-located state to a second wireless node based at least in part on the first distance to the first wireless node; receiving a first position estimate based at least in part on radio frequency signal exchanges between the first wireless node and the second wireless node; determining a second distance to the first wireless node; sending an indication of a non-co-located state to the second wireless node based at least in part on the second distance to the first wireless node; and determining a second position estimate based at least in part on radio frequency signal exchanges with the second wireless node.

Clause 2. The method of clause 1 wherein determining the first distance to the first wireless node and determining the second distance to the first wireless node is based at least in part on a status of a device connection protocol.

Clause 3. The method of clause 1 wherein determining the first distance to the first wireless node and determining the second distance to the first wireless node is based at least in part on a exchanging ranging signals with the first wireless node.

Clause 4. The method of clause 1 wherein the first wireless node is an on-board unit in a vehicle.

Clause 5. The method of clause 1 wherein the second wireless node is a cellular base station.

Clause 6. The method of clause 1 wherein the second wireless node is a roadside unit.

Clause 7. The method of clause 1 wherein the indication of the co-located state is included in a first uplink non-access stratum (NAS) protocol message, and the indication of the non-co-located state is included in a second uplink NAS protocol message.

Clause 8. The method of clause 1 wherein the indication of the co-located state and the indication of the non-co-located state are included in a sidelink message.

Clause 9. The method of clause 1 wherein receiving the first position estimate includes receiving the first position estimate from the first wireless node.

Clause 10. The method of clause 1 wherein receiving the first position estimate includes receiving the first position estimate from the second wireless node.

Clause 11. A method for determining a position estimate for a co-located wireless node, comprising: receiving an indication of a co-located state from a first wireless node; transmitting one or more positioning signals to a second wireless node in response to the indication of the co-located state; determining the position estimate based at least in part on the one or more positioning signals transmitted to the second wireless node; and transmitting the position estimate to the first wireless node.

Clause 12. The method of clause 11 wherein the first wireless node is a pedestrian user equipment and the second wireless node is vehicle user equipment.

Clause 13. The method of clause 11 wherein receiving the indication of the co-located state includes receiving an uplink non-access stratum (NAS) protocol message including the indication of the co-located state.

Clause 14. The method of clause 11 wherein receiving the indication of the co-located state includes receiving a sidelink message including the indication of the co-located state.

Clause 15. The method of clause 14 wherein the sidelink message is at least one of a pre-positioning reference signal (PRS) message or a post-PRS message in a round trip timing message exchange with the first wireless node.

Clause 16. The method of clause 11 wherein transmitting the position estimate includes sending an uplink non-access stratum (NAS) protocol message including the position estimate to the first wireless node.

Clause 17. The method of clause 11 wherein transmitting the position estimate includes sending a sidelink message including the position estimate to the first wireless node.

Clause 18. A method of providing positioning signals with sidelink transmissions, comprising: receiving sidelink positioning switch information from a first wireless node; ceasing transmitting the positioning signals to the first wireless node in response to the sidelink positioning switch information including a first value; and transmitting the positioning signals to the first wireless node in response to the sidelink positioning switch information including a second value.

Clause 19. The method of clause 18 further comprising: determining a location of a second wireless node in response to the sidelink positioning switch information including the first value; and transmitting the location of the second wireless node to the first wireless node.

Clause 20. The method of clause 19 wherein the positioning switch information includes an indication of the second wireless node.

Clause 21. The method of clause 19 wherein the first wireless node is a pedestrian user equipment and the second wireless node is a vehicle user equipment.

Clause 22. The method of clause 21 wherein the vehicle user equipment is an on-board unit.

Clause 23. The method of clause 18 wherein the first wireless node is a roadside unit.

Clause 24. The method of clause 18 wherein receiving sidelink positioning switch information from the first wireless node includes receiving at least one of a pre-positioning reference signal (PRS) message or a post-PRS message including the positioning switch information.

Clause 25. An apparatus, comprising: a memory; at least one transceiver; at least one processor communicatively coupled to the memory and the at least one transceiver, and configured to: determine a first distance to a first wireless node; send an indication of a co-located state to a second wireless node based at least in part on the first distance to the first wireless node; receive a first position estimate based at least in part on radio frequency signal exchanges between the first wireless node and the second wireless node; determine a second distance to the first wireless node; send an indication of a non-co-located state to the second wireless node based at least in part on the second distance to the first wireless node; and determine a second position estimate based at least in part on radio frequency signal exchanges with the second wireless node.

Clause 26. The apparatus of clause 25 wherein the at least one processor is further configured to determine the first distance to the first wireless node and to determine the second distance to the first wireless node based at least in part on a status of a device connection protocol.

Clause 27. The apparatus of clause 25 wherein the at least one processor is further configured to determine the first distance to the first wireless node and to determine the second distance to the first wireless node based at least in part on a exchanging ranging signals with the first wireless node.

Clause 28. The apparatus of clause 25 wherein the first wireless node is an on-board unit in a vehicle.

Clause 29. The apparatus of clause 25 wherein the second wireless node is a cellular base station.

Clause 30. The apparatus of clause 25 wherein the second wireless node is a roadside unit.

Clause 31. The apparatus of clause 25 wherein the indication of the co-located state is included in a first uplink non-access stratum (NAS) protocol message, and the indication of the non-co-located state is included in a second uplink NAS protocol message.

Clause 32. The apparatus of clause 25 wherein the indication of the co-located state and the indication of the non-co-located state are included in a sidelink message.

Clause 33. The apparatus of clause 25 wherein the at least one processor is further configured to receive the first position estimate from the first wireless node.

Clause 34. The apparatus of clause 25 wherein the at least one processor is further configured to receive the first position estimate from the second wireless node.

Clause 35. An apparatus, comprising: a memory; at least one transceiver; at least one processor communicatively coupled to the memory and the at least one transceiver, and configured to: receive an indication of a co-located state from a first wireless node; transmit one or more positioning signals to a second wireless node in response to the indication of the co-located state; determine a position estimate based at least in part on the one or more positioning signals transmitted to the second wireless node; and transmit the position estimate to the first wireless node.

Clause 36. The apparatus of clause 35 wherein the first wireless node is a pedestrian user equipment and the second wireless node is vehicle user equipment.

Clause 37. The apparatus of clause 35 wherein the at least one processor is further configured to receive the indication of the co-located state in an uplink non-access stratum (NAS) protocol message including the indication of the co-located state.

Clause 38. The apparatus of clause 35 wherein the at least one processor is further configured to receive the indication of the co-located state in one or more sidelink messages including the indication of the co-located state.

Clause 39. The apparatus of clause 38 wherein the one or more sidelink messages are at least one of a pre-positioning reference signal (PRS) message or a post-PRS message in a round trip timing message exchange with the first wireless node.

Clause 40. The apparatus of clause 35 wherein the at least one processor is further configured to transmit the position estimate to the first wireless node in an uplink non-access stratum (NAS) protocol message including the position estimate.

Clause 41. The apparatus of clause 35 wherein the at least one processor is further configured to transmit the position estimate to the first wireless node using one or more sidelink messages including the position estimate.

Clause 42. An apparatus, comprising: a memory; at least one transceiver; at least one processor communicatively coupled to the memory and the at least one transceiver, and configured to: receive sidelink positioning switch information from a first wireless node; cease transmitting positioning signals to the first wireless node in response to the sidelink positioning switch information including a first value; and transmit positioning signals to the first wireless node in response to the sidelink positioning switch information including a second value.

Clause 43. The apparatus of clause 42 wherein the at least one processor is further configured to: determine a location of a second wireless node in response to the sidelink positioning switch information including the first value; and transmit the location of the second wireless node to the first wireless node.

Clause 44. The apparatus of clause 43 wherein the positioning switch information includes an indication of the second wireless node.

Clause 45. The apparatus of clause 43 wherein the first wireless node is a pedestrian user equipment and the second wireless node is a vehicle user equipment.

Clause 46. The apparatus of clause 45 wherein the vehicle user equipment is an on-board unit.

Clause 47. The apparatus of clause 42 wherein the first wireless node is a roadside unit.

Clause 48. The apparatus of clause 42 wherein the at least one processor is further configured to receive the sidelink positioning switch information from the first wireless node via at least one of a pre-positioning reference signal (PRS) message or a post-PRS message including the positioning switch information.

Clause 49. An apparatus for positioning co-located user equipment in a vehicle-to-everything (V2X) environment, comprising: means for determining a first distance to a first wireless node; means for sending an indication of a co-located state to a second wireless node based at least in part on the first distance to the first wireless node; means for receiving a first position estimate based at least in part on radio frequency signal exchanges between the first wireless node and the second wireless node; means for determining a second distance to the first wireless node; means for sending an indication of a non-co-located state to the second wireless node based at least in part on the second distance to the first wireless node; and means for determining a second position estimate based at least in part on radio frequency signal exchanges with the second wireless node.

Clause 50. An apparatus for determining a position estimate for a co-located wireless node, comprising: means for receiving an indication of a co-located state from a first wireless node; means for transmitting one or more positioning signals to a second wireless node in response to the indication of the co-located state; means for determining the position estimate based at least in part on the one or more positioning signals transmitted to the second wireless node; and means for transmitting the position estimate to the first wireless node.

Clause 51. An apparatus for providing positioning signals with sidelink transmissions, comprising: means for receiving sidelink positioning switch information from a first wireless node; means for ceasing transmitting the positioning signals to the first wireless node in response to the sidelink positioning switch information including a first value; and transmitting the positioning signals to the first wireless node in response to the sidelink positioning switch information including a second value.

Clause 52. A non-transitory processor-readable storage medium comprising processor-readable instructions configured to cause one or more processors to determine the position co-located user equipment in a vehicle-to-everything (V2X) environment, comprising code for: determining a first distance to a first wireless node; sending an indication of a co-located state to a second wireless node based at least in part on the first distance to the first wireless node; receiving a first position estimate based at least in part on radio frequency signal exchanges between the first wireless node and the second wireless node; determining a second distance to the first wireless node; sending an indication of a non-co-located state to the second wireless node based at least in part on the second distance to the first wireless node; and determining a second position estimate based at least in part on radio frequency signal exchanges with the second wireless node.

Clause 53. A non-transitory processor-readable storage medium comprising processor-readable instructions configured to cause one or more processors to determine a position estimate for a co-located wireless node, comprising code for: receiving an indication of a co-located state from a first wireless node; transmitting one or more positioning signals to a second wireless node in response to the indication of the co-located state; determining the position estimate based at least in part on the one or more positioning signals transmitted to the second wireless node; and transmitting the position estimate to the first wireless node.

Clause 54. A non-transitory processor-readable storage medium comprising processor-readable instructions configured to cause one or more processors to provide positioning signals with sidelink transmissions, comprising code for: receiving sidelink positioning switch information from a first wireless node; ceasing transmitting the positioning signals to the first wireless node in response to the sidelink positioning switch information including a first value; and transmitting the positioning signals to the first wireless node in response to the sidelink positioning switch information including a second value.

The invention claimed is:

1. A method for positioning co-located user equipment in a vehicle-to-everything (V2X) environment, comprising:
   determining a first distance to a first wireless node;
   sending an indication of a co-located state to a second wireless node based at least in part on the first distance to the first wireless node, wherein the indication of the co-located state is an information element comprising a flag indicating a true state;
   receiving a first position estimate based at least in part on radio frequency signal exchanges between the first wireless node and the second wireless node;
   determining a second distance to the first wireless node;
   sending an indication of a non-co-located state to the second wireless node based at least in part on the second distance to the first wireless node, wherein the indication of the non-co-located state is an information element comprising a flag indicating a false state; and
   determining a second position estimate based at least in part on radio frequency signal exchanges with the second wireless node.

2. The method of claim 1 wherein determining the first distance to the first wireless node and determining the second distance to the first wireless node is based at least in part on a status of a device connection protocol.

3. The method of claim 1 wherein determining the first distance to the first wireless node and determining the second distance to the first wireless node is based at least in part on a exchanging ranging signals with the first wireless node.

4. The method of claim 1 wherein the first wireless node is an on-board unit in a vehicle.

5. The method of claim 1 wherein the second wireless node is a cellular base station.

6. The method of claim 1 wherein the second wireless node is a roadside unit.

7. The method of claim 1 wherein the indication of the co-located state is included in a first uplink non-access stratum (NAS) protocol message, and the indication of the non-co-located state is included in a second uplink NAS protocol message.

8. The method of claim 1 wherein the indication of the co-located state and the indication of the non-co-located state are included in a sidelink message.

9. The method of claim 1 wherein receiving the first position estimate includes receiving the first position estimate from the first wireless node.

10. The method of claim 1 wherein receiving the first position estimate includes receiving the first position estimate from the second wireless node.

11. A method for determining a position estimate for a co-located wireless node, comprising:
    receiving an indication of a co-located state from a first wireless node, wherein the indication of the co-located state in an information element comprising a flag indicating a true state;
    transmitting one or more positioning signals to a second wireless node in response to the indication of the co-located state;
    determining the position estimate based at least in part on the one or more positioning signals transmitted to the second wireless node; and
    transmitting the position estimate to the first wireless node.

12. The method of claim 11 wherein the first wireless node is a pedestrian user equipment and the second wireless node is vehicle user equipment.

13. The method of claim 11 wherein receiving the indication of the co-located state includes receiving an uplink non-access stratum (NAS) protocol message including the indication of the co-located state.

14. The method of claim 11 wherein receiving the indication of the co-located state includes receiving a sidelink message including the indication of the co-located state.

15. The method of claim 14 wherein the sidelink message is at least one of a pre-positioning reference signal (PRS) message or a post-PRS message in a round trip timing message exchange with the first wireless node.

16. The method of claim 11 wherein transmitting the position estimate includes sending an uplink non-access stratum (NAS) protocol message including the position estimate to the first wireless node.

17. The method of claim 11 wherein transmitting the position estimate includes sending a sidelink message including the position estimate to the first wireless node.

18. An apparatus, comprising:
    a memory;
    at least one transceiver;
    at least one processor communicatively coupled to the memory and the at least one transceiver, and configured to:
       determine a first distance to a first wireless node;
       send an indication of a co-located state to a second wireless node based at least in part on the first distance to the first wireless node, wherein the indication of the co-located state is an information element comprising a flag indicating a true state;
       receive a first position estimate based at least in part on radio frequency signal exchanges between the first wireless node and the second wireless node;
       determine a second distance to the first wireless node;
       send an indication of a non-co-located state to the second wireless node based at least in part on the second distance to the first wireless node, wherein the indication of the non-co-located state is an information element comprising a flag indicating a false state; and
       determine a second position estimate based at least in part on radio frequency signal exchanges with the second wireless node.

19. The apparatus of claim 18 wherein the at least one processor is further configured to determine the first distance to the first wireless node and to determine the second distance to the first wireless node based at least in part on a status of a device connection protocol.

20. The apparatus of claim 18 wherein the at least one processor is further configured to determine the first distance to the first wireless node and to determine the second distance to the first wireless node based at least in part on a exchanging ranging signals with the first wireless node.

21. The apparatus of claim 18 wherein the first wireless node is an on-board unit in a vehicle, and the second wireless node is a cellular base station or a roadside unit.

22. The apparatus of claim 18 wherein the indication of the co-located state is included in a first uplink non-access stratum (NAS) protocol message, and the indication of the non-co-located state is included in a second uplink NAS protocol message.

23. The apparatus of claim 18 wherein the indication of the co-located state and the indication of the non-co-located state are included in a sidelink message.

24. The apparatus of claim 18 wherein the at least one processor is further configured to receive the first position estimate from the first wireless node.

25. The apparatus of claim 18 wherein the at least one processor is further configured to receive the first position estimate from the second wireless node.

26. An apparatus, comprising:
    a memory;
    at least one transceiver;
    at least one processor communicatively coupled to the memory and the at least one transceiver, and configured to:
       receive an indication of a co-located state from a first wireless node, wherein the indication of the co-located state in an information element comprising a flag indicating a true state;
       transmit one or more positioning signals to a second wireless node in response to the indication of the co-located state;
       determine a position estimate based at least in part on the one or more positioning signals transmitted to the second wireless node; and
       transmit the position estimate to the first wireless node.

27. The apparatus of claim 26 wherein the first wireless node is a pedestrian user equipment and the second wireless node is vehicle user equipment.

28. The apparatus of claim 26 wherein the at least one processor is further configured to receive the indication of the co-located state in an uplink non-access stratum (NAS) protocol message including the indication of the co-located state.

29. The apparatus of claim 26 wherein the at least one processor is further configured to receive the indication of the co-located state in one or more sidelink messages including the indication of the co-located state.

30. The apparatus of claim 29 wherein the one or more sidelink messages are at least one of a pre-positioning reference signal (PRS) message or a post-PRS message in a round trip timing message exchange with the first wireless node.

* * * * *